(12) United States Patent
Tanabe et al.

(10) Patent No.: US 7,637,676 B2
(45) Date of Patent: Dec. 29, 2009

(54) PHOTOGRAPHIC PACK AND PRINT SYSTEM

(75) Inventors: Tsuyoshi Tanabe, Kanagawa (JP); Takayuki Iida, Kanagawa (JP); Naoyuki Morita, Kanagawa (JP)

(73) Assignee: Fujifilm COrporation, Tokyo (JP)

( * ) Notice: Subject to any disclaimer, the term of this patent is extended or adjusted under 35 U.S.C. 154(b) by 785 days.

(21) Appl. No.: 11/476,029

(22) Filed: Jun. 28, 2006

(65) Prior Publication Data

US 2006/0290995 A1 Dec. 28, 2006

(30) Foreign Application Priority Data

Jun. 28, 2005 (JP) .............................. 2005-188069

(51) Int. Cl.
*G03D 3/00* (2006.01)
*G03D 13/08* (2006.01)

(52) U.S. Cl. ...................................... 396/647; 396/564

(58) Field of Classification Search ................. 396/564, 396/612, 636, 647
See application file for complete search history.

(56) References Cited

U.S. PATENT DOCUMENTS 5,940,168 A * 8/1999 Ishii ............................ 355/40
6,959,508 B2 * 11/2005 Watkins et al. ................. 40/641
2002/0034392 A1 * 3/2002 Baum et al. ................... 396/564
2006/0193000 A1 * 8/2006 Enomoto .................... 358/1.15

FOREIGN PATENT DOCUMENTS

| JP | 61-239235 A | 10/1986 |
|---|---|---|
| JP | 9-292660 A | 11/1997 |
| JP | 3551402 B2 | 5/2004 |

* cited by examiner

*Primary Examiner*—Rodney E Fuller
(74) *Attorney, Agent, or Firm*—Birch, Stewart, Kolasch & Birch, LLP

(57) ABSTRACT

A photographic pack includes photographic prints in one order, an order information print for the one order having index images recorded on a first side and at least a fee recorded on a second side, and a bag having at least a transparent area, and for accommodating a stack formed by superposing the order information print and the photographic prints. A non-image recording side of a first print of the photographic prints in the stack faces outward, the second side of the order information print faces outward and the rest of the photographic prints are sandwiched between the first print and the order information print. A print system includes an order receiver for receiving the one order of a customer, a fee calculator for calculating a fee, a printer for preparing the photographic prints and the order information print, and a packer for preparing the photographic pack.

16 Claims, 8 Drawing Sheets

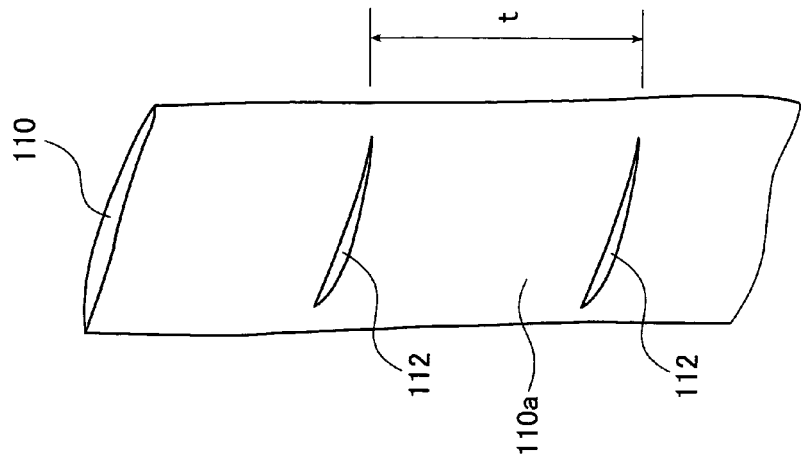
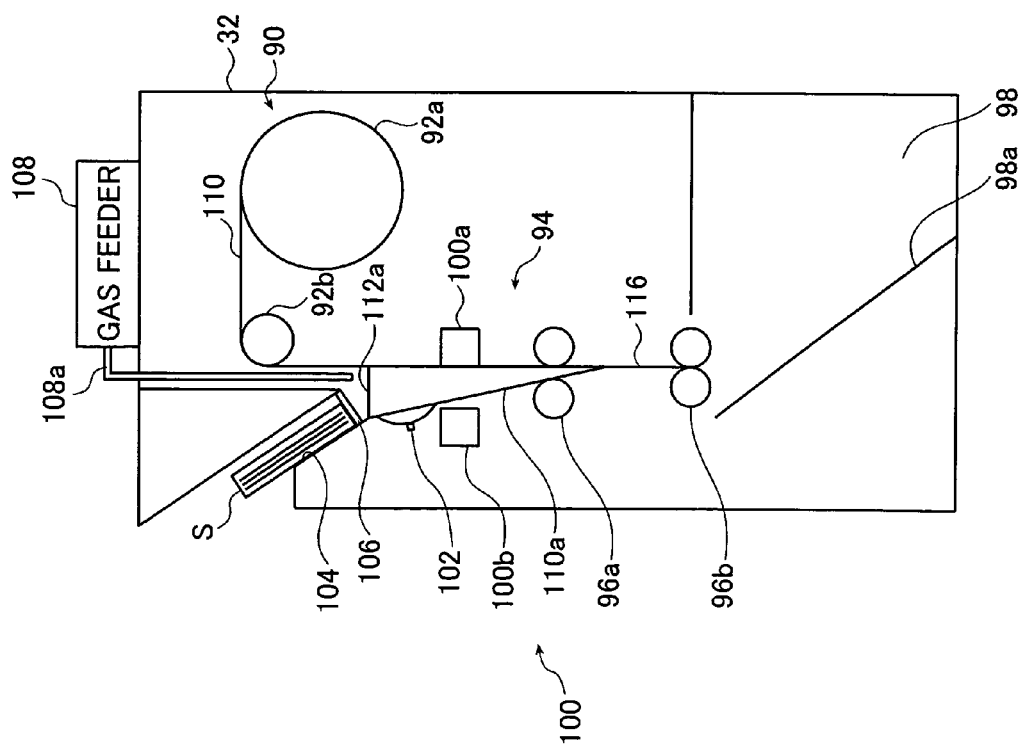
FIG. 4B
FIG. 4A (a)

(b)

PHOTOGRAPHIC PACK AND PRINT SYSTEM

The entire contents of literatures cited in this specification are incorporated herein by reference.

BACKGROUND OF THE INVENTION

This invention relates to a photographic pack that ensures that images on internally accommodated photographic prints cannot be seen from the outside, and a print system that can produce the photographic pack without causing any waste of print paper.

Conventionally, photographic prints in one order and an index print which has all images of the photographic prints recorded on a single recording medium are accumulated on a sorter and then an operator manually checks the accumulated prints against a customer's information, order information, print fee and the like on a DP bag before packaging them into a DP bag (see, for example, JP 61-239235 A).

JP 61-239235 A discloses a photographic printing apparatus which, in the process of making photographic prints by printing, uses a marker to mark print information such as the number of prints to make and the print fee on the back of the last frame of photographic prints. Using this photographic printing apparatus, one can eliminate the need to indicate the print information on the DP bag and instead need only depend on the clear film that forms a window in the DP bag for verifying the print fee and print information recorded on the back of the last frame without taking the photographic prints from within the DP bag.

However, checking and verifying the print information and subsequent packing of the photographic prints into the DP bag, all being done manually by an operator, is time-consuming. To deal with this problem, there has been proposed a packing apparatus that contributes to labor saving in the packing of photographic prints into the DP bag by the operator (see, for example, JP 9-292660 A and JP 3551402 B).

As referred to above, the packing apparatus is an apparatus by which the photographic prints and index print as accumulated on the sorter are collectively put into a clear bag which is then sealed. In this case, an order print with a bar code is placed in the topmost part of the bag so that the print information such as the print fee and the number of prints can be easily verified and checked.

JP 9-292660 A discloses a photographic print producing apparatus which makes photographic prints in one order, immediately followed by making an index print having fee information printed on it, and which accumulates both the photographic prints and the index print, whereby the photographic prints in one order can be efficiently sorted out to facilitate the packing operation by the packing apparatus.

JP 3551402 B discloses a photographic product producing system in which a recording medium having the fee recorded thereon (the medium is hereinafter referred to as a fee print) is provided immediately before or after photographic prints and which allows the fee print and the photographic prints to accumulate on a sorter in such a way that the former overlies the latter. The photographic prints produced by the system of JP 3551402 B are accommodated within a DP bag with a clear top face in such a way that the fee print overlies the topmost photographic print and can therefore be seen from the outside.

The photographic printing apparatus disclosed in JP 61-239235 A marks the print information on the back of the last frame of photographic prints. Since the print information such as the print fee is marked on the back of the last frame of photographic prints made by the photographic printing apparatus disclosed in JP 61-239235 A, there is a problem in that if the person who shot the original pictures distribute the photographic prints among friends or acquaintances, the print information such as the print fee will become known. Therefore, the photographic print of the last frame should not preferably be distributed among friends or acquaintances.

The photographic print producing apparatus disclosed in JP 9-292660 A and the photographic product producing system disclosed in JP 3551402 B do not mark print information such as the contents of an order on the back of a photographic print; on the other hand, they must use one extra sheet of print paper for making the fee print. This is simply a waste of print paper and results in lower production rate.

These two patent documents also disclose recording both the index image and the print information on the same side of one sheet of print paper so that the index print becomes integral with the fee print. However, if this is done, the index image within the clear bag can also be seen from the outside by people other than the person who placed the order and the privacy of customers cannot be protected.

SUMMARY OF THE INVENTION

The present invention has been accomplished in order to solve the aforementioned problems of the conventional techniques. It has as an object providing a photographic pack that does not allow the images of photographic prints to be seen from the outside so that the privacy of customers can be protected and which does not either distribute any photographic prints to other people, with the print information such as the print fee being marked thereon, or use an extra sheet of print paper for making the fee print and the like. Another object of the present invention is to provide a print system that can produce such photographic packs without causing any waste of print paper as would result from using one extra sheet of print paper for making the fee print and the like.

In order to achieve the above object, a first aspect of the present invention provides a photographic pack including:

photographic prints in one order, each having an image recorded on one side;

an order information print that has index images in the one order recorded on a first side, each corresponding to the image and at least a fee for the photographic prints in the one order recorded on a second side; and an at-least-partially-transparent bag having at least a transparent area, and for accommodating a stack formed by superposing the order information print and the photographic prints in the one order, wherein a non-image recording side of a first photographic print of the photographic prints in the stack faces outward, the second side of the order information print faces outward and is positioned at the transparent area of the bag, and the rest of the photographic prints in the one order are sandwiched between the first photographic print and the order information print.

Further, in the present invention, preferably, the rest of the photographic prints in the one order have their non-image recording sides face the same direction as the non-image recording side of the first photographic print.

Further, in the present invention, preferably, at least information about a customer and contents of the one order of the customer are further recorded on the second side of the order information print.

Further, in the present invention, preferably, the fee for the photographic prints in the one order is recorded in bar code.

A second aspect of the present invention provides a print system including:

an order reception means or an order receiver for receiving one order of a customer including order information data about contents of a printing order, and image data;

a fee calculating means or a fee calculator for calculating a fee for photographic prints in the one order, each having an image recorded on one side, based on the one order of the customer;

a printer which, based on the order information data and the image data that have been received by the order reception means or the order receiver for the one order, prepares the photographic prints in the one order and an order information print that has index images in the one order recorded on a first side, each corresponding to the image and at least a fee for the photographic prints in the one order recorded on a second side; and a packaging means or a packer by which a stack formed by superposing the order information print and the photographic prints in the one order is accommodated and packaged in an at-least-partially-transparent bag having at least a transparent area, wherein a non-image recording side of a first photographic print of the photographic prints in the stack faces outward, the second side of the order information print faces outward and is positioned at the transparent area of the bag, and the rest of the photographic prints in the one order are sandwiched between the first photographic print and the order information print.

Further, in the present invention, preferably, the printer includes an image recording unit for recording the image on one side of a recording medium and an information recording unit for recording information on the other side of the recording medium;

each of the photographic prints is such that the image reproducing the image data for a single print is recorded on a image recording side being the one side of the recording medium by means of the image recording unit and that back print information is recorded on the non-image recording side being the other side of the recording medium by means of the information recording unit; and the order information print is such that the index images for the one order are recorded on the first side being the one side of the recording medium by means of the image recording unit and that at least the fee for the photographic prints in the one order is recorded on the second side being the other side of the recording medium by means of the information recording unit.

Further, in the present invention, preferably, the packaging means or the packer includes a reversing means or a reversing unit for reversing at least one of the photographic prints or the order information print outputted from the printer.

Further, in the present invention, preferably, the printer further includes a reversing means or a reversing unit for reversing at least one of the photographic prints or the order information print.

Further, in the present invention, preferably, the reversing means or the reversing unit reverses one photographic print or the order information print that has been prepared in the printer as last one of the photographic prints in the one order and the order information print.

Further, in the present invention, preferably, the printer includes a first image recording unit for recording an image on one side of a recording medium and a second image recording unit for recording an image on the other side of the recording medium, at least one of the first and second image recording units records, in addition to the image, at least the fee for the photographic prints in one order; and the index images for the one order have been recorded on the first side of the order information print by one of the first and second image recording units and the fee for the photographic prints in the one order have been recorded on the second side by the other of the first and second image recording units.

The photographic pack according to the first aspect of the present invention has such a structure that among the photographic prints in one order, the first photographic print with the non-image recording side facing outward and an order information print with the first side on which index images are recorded facing inward and the second side on which the fee for the photographic prints in one order is recorded facing outward are superposed to form a stack, with the rest of the photographic prints in one order being sandwiched between the first photographic print and the order information print and with the stack being accommodated within a bag that is at least partially transparent. Because of this structure, there will be no possibility that the index images and the images recorded on the photographic prints are seen from the outside. As a result, customers can receive the photographic packs without letting other people see the images of the photographic prints that they have ordered to produce. In addition, the privacy of customers is protected.

Since the order information print in the photographic pack according to the present invention is oriented in such a way that the second side which has recorded thereon the fee for the photographic prints in one order faces outward, the fee for the photographic prints can be recognized from the outside of the bag. Hence, the customer has no need to open the clear bag of the photographic pack in order to verify the fee for the photographic prints within the pack in one order. Further in addition, the order information print has the index images and the order information such as the fee for the photographic prints recorded on the two sides and, hence, there will be no waste of print paper as exemplified by using one extra sheet of print paper for recording the fee and other kinds of order information. What is more, the print fee is not recorded on the back of any photographic print, so the customer can distribute the completed photographic prints among others including friends and acquaintances without suffering any inconveniences.

If the order information print is such that the print fee and other pieces of information that the customer does not want others to know are recorded in a bar code, there will be no inconvenience even if the photographic pack itself is handed to another person.

The print system according to the second aspect of the present invention has such a feature that on the basis of an order placed by a customer for one order, a photographic pack can be automatically produced which is characterized in that among the photographic prints in one order, the first photographic print with the non-image recording side facing outward and an order information print with the first side on which index images are recorded facing inward and the second side on which the fee for the photographic prints in one order is recorded facing outward are superposed to form a stack, with the rest of the photographic prints in one order being sandwiched between the first photographic print and the order information print and with the stack being accommodated within a bag that is at least partially transparent. By providing the order information print that has the index images and the order information such as the fee for the photographic prints recorded on the two sides, one can eliminate any waste of print paper as exemplified by using one extra sheet of print paper for recording the fee and other kinds of order information.

Further, the print system according to the second aspect of the present invention is that the side of the order information print where the fee for the photographic prints is recorded faces outward; this orientation eliminates the possibility that the index images and the images recorded on the photographic prints will be seen from the outside. As a result, a photographic pack can be produced that does not allow other people to see the images of the photographic prints that the customer has ordered to make and which hence assures protection of the customer's privacy. Further in addition, the side where the fee for the photographic prints is recorded faces outward and, hence, can be recognized from the outside of the bag; hence, the customer has no need to open the clear bag of the photographic pack in order to verify the fee for the photographic prints in one order.

BRIEF DESCRIPTION OF THE DRAWINGS

FIG. 4A is a schematic cross-sectional view showing an exemplary packer in the one-side image forming apparatus of the embodiment;

FIG. 4B is a schematic perspective view showing an exemplary packaging sheet which is to be used in the packer of the embodiment;

THE BEST EMBODIMENTS FOR IMPLEMENTING THE INVENTION

On the following pages, the photographic pack and print system of the present invention are described with reference to the preferred embodiments shown in the accompanying drawings.

Figure 1:
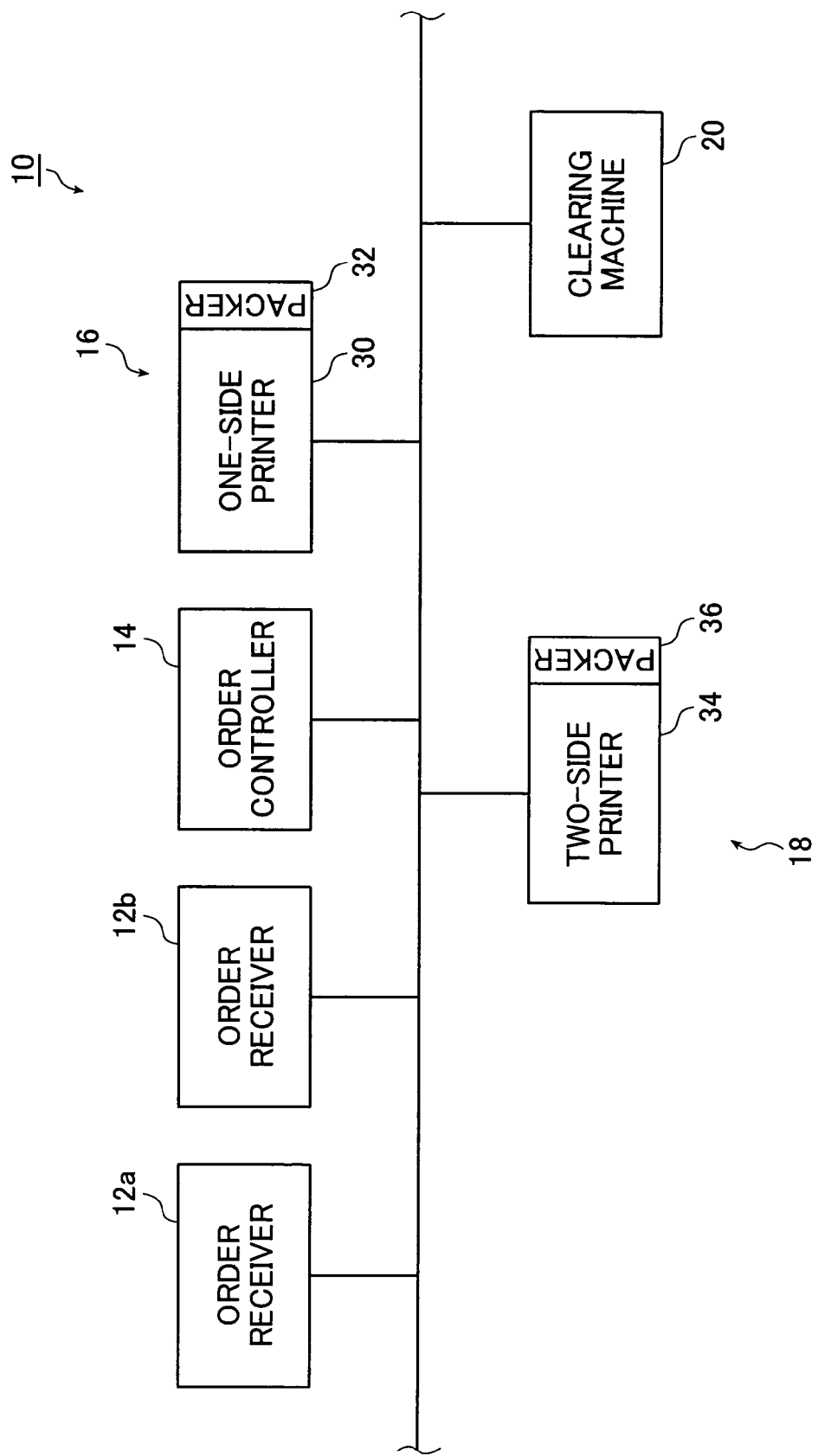
FIG. 1 is a schematic block diagram showing an exemplary print system for producing a photographic pack according to an embodiment of the present invention.

FIG. 1 is a schematic block diagram showing one embodiment of a print system for producing a photographic pack according to the present invention.

As shown in FIG. 1, the print system 10 comprises order receivers (order-receiving means) 12a and 12b, an order controller 14, a one-side image forming apparatus 16, a two-side image forming apparatus 18, and a clearing machine 20.

The order receivers 12a and 12b are set up at a suitable point in a lab shop, say, at the counter to receive a customer's order; to this end, the operator enters order information data such as the contents and particulars of the order, which are then received and registered. The order receivers 12a and 12b are typically includes a personal computer (PC) having a monitor display screen.

Concurrent with a customer's order, the image data for the images to be printed is also received by the order receivers 12a and 12b. The image data to be received by the order receivers 12a and 12b is not limited to that for the images that are to be recorded on one side of a recording medium in the one-side image forming apparatus 16 or the like; it may be for the images that are to be recorded on both sides of a recording medium in the two-side image forming apparatus 18.

In the order receivers 12a and 12b, when the order information data is entered and the order is fixed, for example, the order reception number is tagged to the order information data and, at the same time, the date and time of order reception is recorded. In addition, the order information data is checked and if the customer is found to have been previously entered, the current effective customer ID is tagged. If the customer is found not to have been previously entered, a new customer ID is tagged. Thus, in the order receivers 12a and 12b, the order reception number, the date and time of order reception, and the customer ID are tagged to the order information data, which is then outputted to the order controller 14 together with the image data from which the customer has ordered to make prints.

Alternatively, the order receivers 12a and 12b may be of such a type that customers themselves receive and register a simple order; in this case, the order receiver typically includes a personal computer (PC) having a monitor display screen. The PC of the order receivers 12a and 12b may comprise a monitor (display) as well as input devices such as a keyboard and a mouse, and a memory or a storage device (HDD) for a temporary storage of the order information data, software, and the like; the PC also includes a printer for printing a claim receipt that is issued when the order is fixed. It is more preferred that the PC further include a media drive for retrieving image data and the like from media such as a memory card, CD, MO, and FD.

In another possible case, the operator may receive a roll of exposed film at, for example, the counter of a lab shop where the order receivers 12a and 12b are set up. The operator may then develop the film and read the developed film with a film scanner to acquire image data.

The place where the order receivers 12a and 12b are to be set up is by no means limited to the counter of a lab shop and they may be set up in other places of a lab shop or at the counter of other shops such as a convenience store. If necessary, the order receivers 12a and 12b may be accessed over a web such as the Internet. The format of the claim receipt is not limited in any particular way and all that is required is that the date and time when the customer can get the finished product and like information should be recorded on the claim receipt.

In the embodiment, the order information data which is to be entered into the order receivers 12a and 12b is typically customer information such as the name, telephone number and address of the customer. The order information data may further include, for example, the type of print (which may be the species of its surface such as gloss, silk or matte), the size and number of prints, how the image to be printed should be finished, and the particulars of print processing (the contents of the order) such as whether a print should be made with synthesized templates.

The order controller 14 controls the order information data and the image data that have been entered into the order receivers 12a and 12b. The order controller 14 may include an image-processing unit (not shown) so that the image data for the images that are to be printed is converted to printing image data.

Having an additional function of editing fee information on the basis of the order information data, the order controller 14 also serves as fee calculating means of the present invention. As will be described later, the order controller 14 outputs fee data for one order into the clearing machine 20.

The order controller 14 has price database (not shown) that stores a fee schedule for print processing, covering such items as the fee per print, the fee for image retouching, the fee for a print made with synthesized templates, and the fee for the use of a special recording medium. By referring to this price database (not shown), the order controller 14 calculates the fee on the basis of the fee information. The fee data for one order may be controlled as part of the order information data.

On the basis of the order information data, the order controller 14 sends the image data for one order to the one-side printer (capable of printing on one side) or the two-side printer (capable of printing on both sides), each printer being connected to the print system 10. In other words, the order controller 14 controls job sorting according to the order for one order of job.

By means of the above-mentioned image processing unit, the order controller 14 prepares indexing image data from the printing image data so that the individual images of one order will collectively be recorded in a smaller size on one side of the recording medium; in addition, on the basis of the order information data including the fee data, the order controller 14 prepares data for the fee recording side which complies with the format of the other side, or the fee recording side, of the recording medium. Thus, in the order controller 14, the printing image data, the indexing image data and the data for the fee recording side are put together to create print order information for one order. The resulting print order information is outputted to either the one-side image forming apparatus 16 or the two-side image forming apparatus 18.

In the embodiment, the print order information contains the order in which photographic prints and an order information print are to be made.

In the case of outputting the print order information to the two-side image forming apparatus 18, it has also been determined as to which of the two sides of the recording medium should be assigned to the recording of the index images or the fee in connection with the photographic prints and the order information print.

Figure 6A:
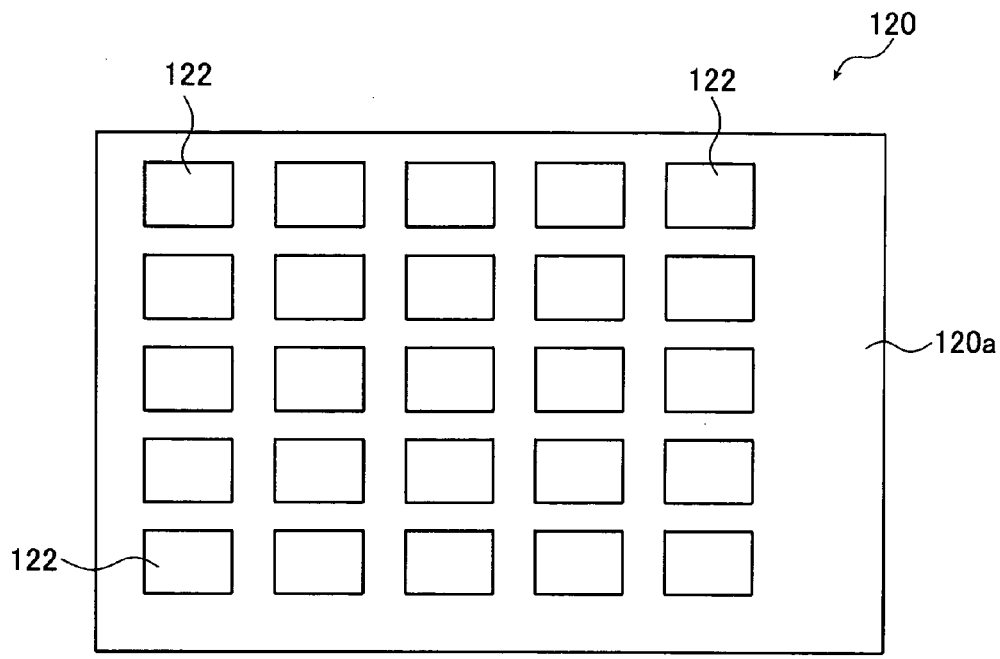
FIG. 6A is a schematic diagram showing an exemplary index image recording side of the order information print according to the embodiment.
Figure 6B:
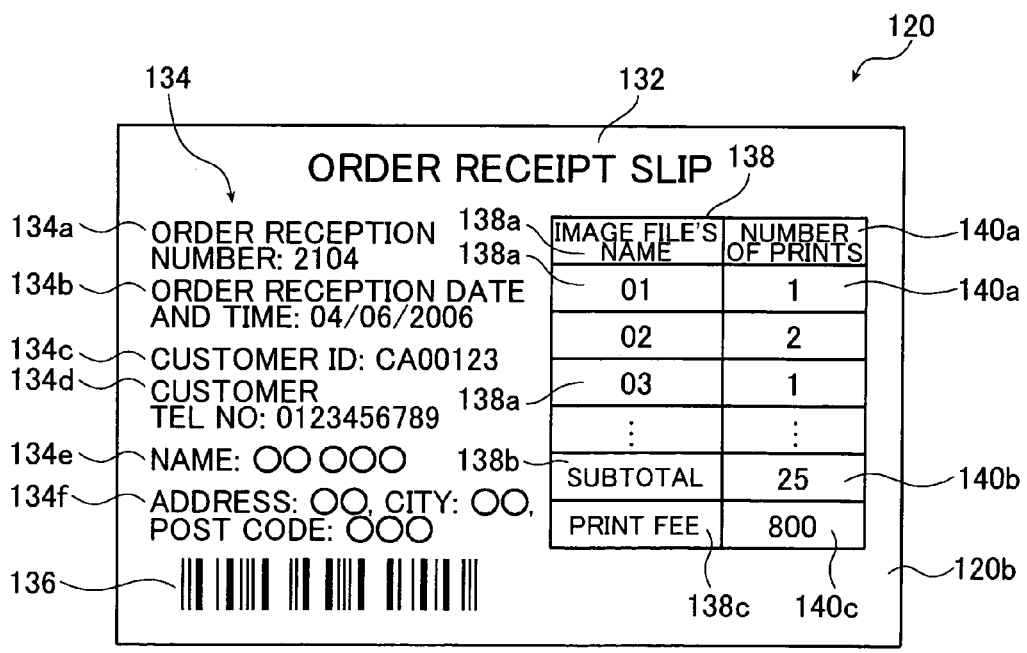
FIG. 6B is a schematic diagram showing an exemplary print fee recording side of the order information print according to the embodiment.

As used herein, the term "order information print" typically means a print such that the index images for one order are recorded on one side (first side) of the recording medium whereas order information data (data for the fee recording side) which includes the fee for photographic prints in at least one order is recorded on the other side (second side) of the recording medium (see FIGS. 6A and 6B).

Receiving the print order information from the order controller 14, the one-side image forming apparatus 16 or the two-side image forming apparatus 18 produces photographic prints P in one order (see FIG. 5A) and an order information print 120 (see FIGS. 6A and 6B) on the basis of the received print order information, superposes the photographic prints P and the order information print 120 to form a stack S (see FIG. 5A), and packages the whole stack S into a bag that is at least partially transparent.

The one-side image forming apparatus 16 has a one-side printer 30 capable of forming images on one side of the recording medium, and a packer (packaging means) 32 by which the photographic prints P and the order information print 120 produced by the one-side printer 30 are superposed to form a stack S which is then packaged into a bag that is at least partially transparent. Details of the one-side printer 30 and the packer 32 will be given later.

The two-side image forming apparatus 18 has a two-side printer 34 capable of forming images on both sides of the recording medium, and a packer (packaging means) 36 by which the photographic prints P and the order information print 120 produced by the two-side printer 34 are superposed to form a stack S which is then packaged into a bag that is at least partially transparent.

The two-side printer 34 produces an order information print which is such that the index images for one order are recorded on one side of the recording medium whereas the order information data including the fee is recorded on the other side of the recording medium. If desired, printing image data for two different prints or one print may be based to produce photographic prints P each having the same or different print images formed on two sides of the recording medium.

Details of the two-side printer 34 and the packer 36 will be given later.

The clearing machine 20 clears the printing fee each time the photographic prints in one order are made, and it may be set up in a lab shop or other place at a site either adjacent to or distant from the order receivers 12a and 12b.

A photographic pack 114 is handed to the customer and in the embodiment, this may be done at the site where the clearing machine 20 is set up and in exchange for the claim receipt shown by the customer. Looking at the fee for the photographic prints in one order that is recorded on the fee recording side 120b of the order information print (see FIG. 6B), the customer pays the fee.

In the case where the fee recording side 120b of the order information print has a bar code recorded on it correlated with the fee for the photographic prints in one order, the operator may read the bar code and ask the customer to make the necessary payment. Thus, on the basis of the fee data outputted from the order receivers 12a or 12b, the clearing machine 20 makes settlement of the fee for the photographic pack 114.

Note that in the case where the order information print has the print fee recorded in bar code, it is not easy for people other than the customer to know the fee and other personal information, so the order information print on which the index images are recorded and even the photographic pack of the present invention can be distributed among such other people.

On the following pages, the one-side image forming apparatus 16 is described in detail with reference to FIGS. 2 to 4B.

Figure 2:
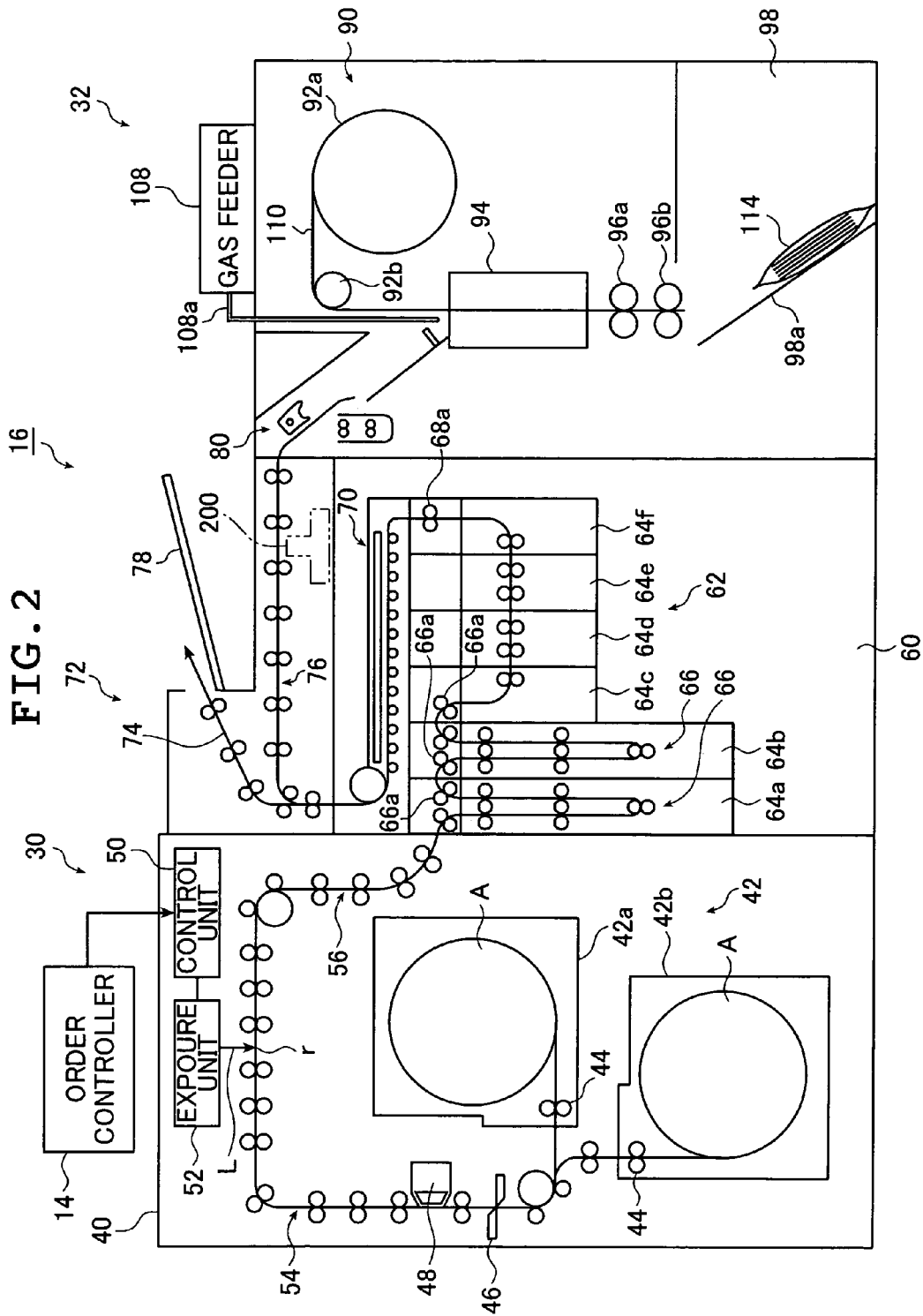
FIG. 2 is a schematic cross-sectional view showing an exemplary one-side image forming apparatus for producing a photographic pack according to the embodiment of the present invention.
Figure 3:
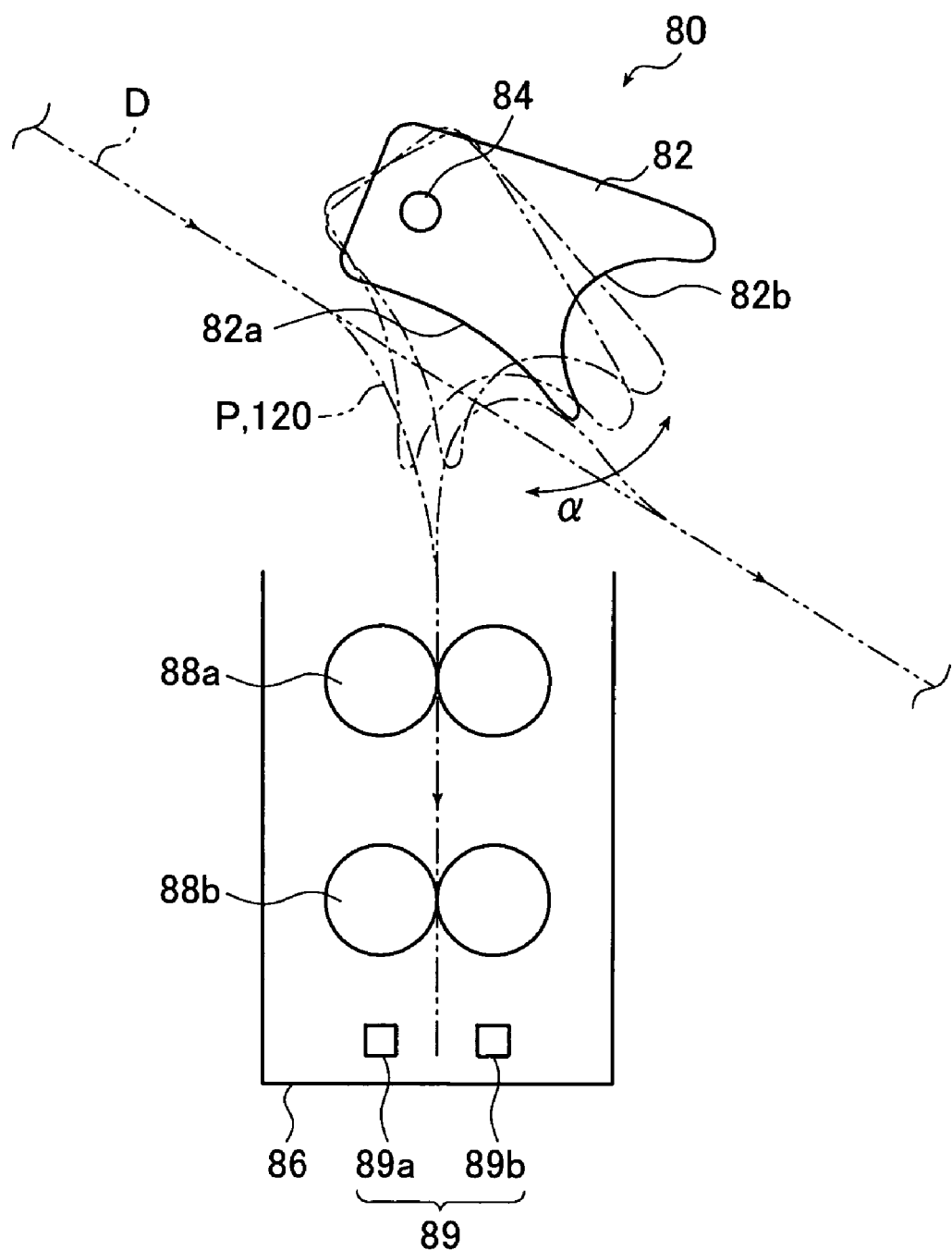
FIG. 3 is a schematic cross-sectional view showing an exemplary switch-back unit in the one-side image forming apparatus of the embodiment.

FIG. 2 is a schematic cross-sectional view showing a one-side image forming apparatus for producing a photographic pack according to the embodiment of the present invention; FIG. 3 is a schematic view showing a switch-back unit in the one-side image forming apparatus according to the embodiment; FIG. 4A is a schematic view showing the packer in the one-side image forming apparatus according to the embodiment; and FIG. 4B is a schematic view showing the packaging sheet which is to be used in the packer shown according to the embodiment.

As shown in FIG. 2, the one-side printer 30 in the one-side image forming apparatus 16 is an apparatus that forms print images on a photographic light-sensitive material as the recording medium by recording through scanning and exposure with the use of a light beam. In a typical example, a rolled web of long light-sensitive material A is withdrawn by a predetermined length and cut to a length of light-sensitive material in sheet form (which is hereinafter sometimes referred to as sheet piece) A; the sheet piece A is transported to an exposing position r; as a light beam L modulated in accordance with the printing image data supplied from the order controller 14 is deflected in a main scanning direction, the light-sensitive material A is transported for scan in an auxiliary scanning direction perpendicular to the main scanning direction; in this way, the light-sensitive material A is subjected to scanning and exposure by means of the light beam L to form an image (latent image), which is then developed to form a visible image. Note that the light-sensitive material A has a light-sensitive layer formed on one side only.

The one-side printer 30 has a one-side printing section 40 by which the print image is recorded as a latent image on the light-sensitive layer on one side of the light-sensitive material A by scan exposure to the light beam, and a processor 60 that is provided adjacent to the one-side printing section 40 and by which the exposed light-sensitive material A is developed so that the latent image it carries is converted to a visible image.

The one-side image forming apparatus 16 has a control unit 50 that controls its overall operation.

The one-side printing section 40 comprises, in order from the upstream side in the transport direction, a feed unit 42, a back printing unit 48, an exposure unit 52, a distributing unit (not shown), and a discharge unit 56. At each of these sites, a plurality of roller pairs 54 are provided along the transport path, each pair including a roller or a drive roller and a nip roller pairing with the drive roller.

The feed unit 42 supplies the light-sensitive material A (sheet piece) and it is a site where magazines 42a and 42b are loaded. Each of the magazines has a rolled web of long light-sensitive material A, typically wound up in a roll with the recording side facing outward and contained in a light-tight case.

The magazines 42a and 42b usually accommodate two kinds of light-sensitive material A which are different in various respects such as the size (width) of the light-sensitive material A, the type of the light-sensitive surface (e.g. gloss, silk or matte) and the specifications (thickness and the type of the base). In the embodiment, two magazines 42a and 42b are provided but the number of magazines is not particularly limited in the present invention. Just one magazine or three or more magazines may be used in the present invention.

The magazines 42a and 42b are each provided with a withdraw roller pair 44 for withdrawing the light-sensitive material A from within the magazine for subsequent transport.

A cutter 46 is provided at a predetermined distance away from the exit of each of the magazines 42a and 42b.

The withdraw roller pair 44 stops withdrawing the light-sensitive material A after it has withdrawn a predetermined length of the light-sensitive material A in accordance with the print length so that it is cut to a predetermined length of sheet piece with the cutter 46.

In response to a control signal sent from the control unit 50 in the one-side image forming apparatus 16, the cutter 46 cuts the light-sensitive material A that has been withdrawn from the magazine 42a or 42b and the interval at which the cutter 46 cuts the light-sensitive material A is adjusted by the control unit 50. The light-sensitive material A that has been cut to a predetermined length with the cutter 46 is sent to the back printing unit 48 as the sheet piece. In the embodiment, the feed unit 42 is in no way limited to the type that cuts a web of long light-sensitive material A into sheet pieces which are then supplied to the downstream stages; alternatively, it may be of such a type that it supplies preliminarily formed sheet pieces of a predetermined size. If desired, one cutter may be provided for each magazine.

In response to control signals from the control unit 50, the back printing unit 48 produces a fee recording side 120b (see FIG. 6B) on the non-image recording side (non-emulsion coated side or the back side) of the order information print 120 in sheet form; on the fee recording side 120b, there is recorded (back printed) the order information which at least includes the print fee and which is specifically exemplified by the order reception number, the date and time of order reception, customer's ID, the customer's telephone number, the customer's name, the customer's address, the print fee, the number of prints, etc. Having this function, the back printing unit 48 comprises transport roller pairs for transporting the sheet piece, as well as a back printing head (not shown).

The back printing unit 48 may be such a unit that records (back prints) various kinds of information, commonly called "back print", such as the date of taking a picture, the date of printing, frame number, film ID number (symbol), the ID number of the camera used in picture taking, the ID number of photoprinter, etc. on the non-image recording side of a photographic print in sheet form in response to control signals from the control unit 50.

The sheet piece, as it is transported upward by rollers and roller pairs, has the back print recorded on the non-image recording side by means of the back printing unit 48. The back printing unit 48 may comprise a known print head such as an ink-jet head, a dot impact print head or a thermal transfer print head.

The exposure unit 52 may be a known optical beam scanning device which employs a laser beam or other light beam as the recording light. The optical beam scanning device typically comprises light sources that issue light beams L responsible for red (R) exposure, green (G) exposure and blue (B) exposure, respectively, of the sheet piece, as well as modulating means such as an AOM (acoustooptical modulator) that modulates the issued light beams L in accordance with the printing image data being supplied from the order controller 14 after it has been subjected to image processing, a light deflector such as a polygonal mirror that deflects the modulated light beams L in a direction (main scanning direction) perpendicular to the transport direction, and a mirror for adjusting the optical path of an fθ (scanning) lens by which each of the light beams L deflected in the main scanning direction is focused at a specified point in the exposing position r as a beam of a specified diameter.

The exposure unit 52 may also be digital exposing means that uses a variety of light-emitting arrays or space modulator arrays that extend in the main scanning direction perpendicular to the transport direction, as exemplified by a PDP (plasma display) array, an ELD (electroluminescent display) array, an LED (light-emitting diode) array, an LCD (liquid-crystal display) array, a DMD (digital micromirror device, registered trademark) array, a laser array, etc.

Note that the width of main scanning which is performed by the exposure unit 52 with light beams L in the exposing position r is set in such a way that it accommodates differing widths of the sheet piece. The above-described action of the exposure unit 52 is controlled by control signals from the control unit 50.

The light beams L as the recording light are deflected in the main scanning direction (perpendicular to the paper on which FIG. 2 is drawn) whereas the sheet piece is transported by auxiliary scanning roller pairs; hence, the light beams L modulated in accordance with the image data perform two-dimensional scan exposure on the sheet piece to record images.

The configuration of the exposure unit 52 is not limited in any particular way as long as the action of scan recording in the main scanning direction perpendicular to the transport direction of the sheet piece allows for image recording on the sheet piece in transport.

The discharge unit 56 is a unit by which the sheet piece that has been subjected to two-dimensional scan exposure by the light beams L is caused to exit therefrom.

The processor 60 is provided downstream of the discharge unit 56. In the processor 60, the sheet piece (light-sensitive material) bearing the exposed latent image is given specified development and subsequent treatments including drying, thereby rendering the sheet piece into a print that reproduces the image that was recorded on the film. The processor 60 has a plurality of transport roller pairs 66 for transporting the sheet piece.

As shown in FIG. 2, the processor 60 includes a developing unit 62 and a drying unit 70, through which the sheet piece passes to be developed and dried to produce a photographic print.

As shown in FIG. 2, the developing unit 62 has the following tanks arranged horizontally in order from the upstream end of the transport direction of the sheet piece: a developing tank 64*a*, a bleach/fix tank 64*b*, a first wash tank 64*c*, a second wash tank 64*d*, a third wash tank 64*e*, and a fourth wash tank 64*f*. The drying unit 70 is provided downstream of the fourth wash tank 64*f*.

Rollers 66*a* for transporting the exposed sheet piece through the respective tanks are provided upward of the developing tank 64*a*, the bleach/fix tank 64*b* and the first wash tank 64*c*.

The developing tank 64*a* holds a specified volume of developing solution, and the bleach/fix tank 64*b* holds a specified volume of bleach/fix solution. The first wash tank 64*c*, the second wash tank 64*d*, the third wash tank 64*e*, and the fourth wash tank 64*f* hold specified volumes of wash water.

Provided within the developing tank 64*a* and the bleach/fix tank 64*b* are transport roller pairs 66 each including rollers that permit the sheet piece to be transported through those tanks in an approximately U-shape.

The partition (not shown) between the first wash tank 64*c* and the second wash tank 64*d*, the partition (not shown) between the second wash tank 64*d* and the third wash tank 64*e*, and the partition (not shown) between the third wash tank 64*e* and the fourth wash tank 64*f* are each provided with a light-sensitive material passageway (not shown) that admits the passage of the sheet piece but which can block the passage of liquid. The light-sensitive material passageway is provided with a blade (not shown), which blocks the passage of liquid after the sheet piece has passed through it.

In the processor 60, the sheet piece that has been immersed in the developing solution in the developing tank 64*a* is subsequently immersed in the fixing solution in the bleach/fix tank 64*b* before it is transported into the first wash tank 64*c*. In the embodiment, the sheet piece is transported at a predetermined speed as the recording side (emulsion-coated side) where the print image has been recorded with the exposure unit 52 faces up and the non-image recording side faces down.

The sheet piece that has been forwarded into the first wash tank 64*c* is washed with the wash water held within that wash tank 64*c*. The sheet piece that has been washed within the first wash tank 64*c* is transported toward the second wash tank 64*d* and passes through the light-sensitive material passageway (not shown) to be transported into the second wash tank 64*d*.

Thereafter, the sheet piece is sequentially washed with the wash water in the second wash tank 64*d*, the third wash tank 64*e* and the fourth wash tank 64*f* and then transported into the drying unit 70 by means of a pinch roller pair 68*a*. The sheet piece is dried in this drying unit 70.

The drying unit 70 is described below more specifically. The drying unit 70 dries the sheeting that has been subjected to development.

The drying unit 70 typically includes a heater (not shown) and a blower (not shown), and air heated with the heater is blown as warm air against the sheet piece, whereby the sheet piece that has been subjected to development is dried.

The drying unit 70 is connected to a transport unit 72 which in turn is connected to the packer 32. The transport unit 72 selects the photographic prints that should be transported to the packer 32. The transport unit 72 has the first transport path 74 and the second transport path 76. The first transport path 74 has a tray 78 at the exit, onto which those photographic prints that are too large to be transported to the packer 32 are discharged by traveling along the first transport path 74.

In the transport unit 72, the photographic prints and the order information print that are to be packaged by the packer 32 are transported through the second transport path 76. Selection of the photographic prints by the transport unit 72 is performed on the basis of the order information entered into the control unit 50.

In the embodiment, a switch-back unit 80 is provided near the entrance of the packer 32.

As FIG. 3 shows, the switch-back unit 80 includes a guide 82 and a pull-in part 86. The switch-back unit 80 allows a photographic print that does not have to be inverted or turned inside out to simply pass through it, but inverts a photographic print that needs to be turned inside out.

If the photographic print is to be simply passed through the switch-back unit 80, the guide 82 departs away from the transport path D to an upper position in FIG. 3 so that it will not act on the transport path D. If the photographic print is to be inverted, the guide 82 acts on the transport path D such that the photographic print to be inverted is guided into the pull-in part 86, where it is inverted and returned to the transport path D. To perform this action, the guide 82 has a guide face 82*a* for guiding the photographic print to move from the transport path D into the pull-in part 86 and another guide face 82*b* by means of which the photographic print that has been pulled into and inverted in the pull-in part 86 is so guided as to return to the transport path D. The guide 82 is provided above the transport path D in such a way that it can pivot on an axis 84 in two directions indicated by the two-headed arrow α.

The pull-in part 86 includes two pull-in roller pairs 88*a* and 88*b*, and a detection sensor 89.

The detection sensor 89 is typically a photointerrupter, or an optical sensor that detects an object by interruption of emitted light and it includes a light emitter 89*a* and a light receiver 89*b*.

In accordance with the result of detection of the photographic print with the sensor 89, the guide 82 and the pull-in roller pairs 88*a* and 88*b* are controlled.

In the embodiment, when the photographic print that needs to be turned inside out has been transported toward it, the guide 82 which has been at the reference position upward of and away from the transport path D through which the photographic print is to be passed rotates about the axis 84 clockwise in FIG. 3 so that the guide face 82 is moved to the first position that causes the photographic print (120, P) on the transport path D to be directed toward the pull-in roller pair 88a. Thereafter, the pull-in roller pairs 88a and 88b are rotated.

When the photographic print, being guided by the guide face 82a of the guide 82, has been pulled into the roller pairs 88a and 88b and detected by the sensor 89, the guide 82 at the first position rotates about the axis 84 further clockwise in FIG. 3, whereupon the guide face 82b is moved to the second position such that the photographic print which is held in the pull-in roller pairs 88a and 88b in the pull-in part 86 is returned to the transport path D. Thereafter, the pull-in roller pairs 88a and 88b rotate in reverse direction so that the photographic print reverses to emerge from the pull-in part 86 and return to the transport path D. As the result, the photographic print is turned inside out and transported through the path D in the packer 32 as it remains inverted. Thereafter, the guide 82 rotates counterclockwise about the axis 84 to be moved to the reference position which is upward of and away from the transport path D in FIG. 3.

When the photographic print is turned inside out by the switch-back unit 80 in the embodiment, the image is also reversed with respect to the transport direction. To avoid this inconvenience, it is preferred that the photographic print which is to be turned inside out by the switch-back unit 80 is preliminary processed to have an image recorded as reversed with respect to the transport direction.

In the illustrated case, the switch-back unit 80 is provided at the entrance of the packer 32 for turning the desired photographic print inside out. This is not the sole case of the present invention and an inverting mechanism such as a switch-back mechanism may be provided in the developing unit 62, the drying unit 70 or the transport unit 72 of the processor 60. In particular, considering the provision of two transport paths 74 and 76 in the transport unit 72, at least those transport roller pairs along the transport path 74 for large-size prints which are closer to the site where the transport path 74 diverges from the transport path 76 may be so adapted as to be capable of rotating in reverse direction and a guide directed toward the transport path 76 may be provided at the divergence; in this way, an effective inverting mechanism can be constructed in a very simple manner.

As shown in FIG. 4A, the packer 32 is such a device that the order information print 120 and the photographic prints P in one order are superposed to make a stack which is then packaged into a bag that is at least partially transparent. Having this function, the packer 32 comprises a packaging sheet feeder 90, a packaging unit 94, transport roller pairs 96a and 96b, a photographic pack recovery unit 98, and a stock unit 104.

The packaging sheet feeder 90 supplies a packaging sheet 110 for wholly packaging the stack S (see FIG. 5A) made by superposing the order information print 120 and the photographic prints P in one order. To perform this function, the packaging sheet feeder 90 includes a feed roller 92a around which a long packaging sheet 110 is wound, and a discharge roller 92b for unwinding the packaging sheet 110 so that it runs toward the packaging unit 94.

As shown in FIG. 4B, the packaging sheet 110 is generally tubular in shape and has slits 112 formed in the surface 110a at a given spacing of t in the longitudinal direction. The packaging sheet 110 is transparent and may be formed of polypropylene, typically with a thickness of 50 μm.

The packaging unit 94 forms a photographic pack 114 which accommodates the order information print 120 and the photographic prints P in one order; to this end, the packaging unit 94 seals the packaging sheet 110 as it accommodates the order information print 120 and the photographic prints P and then cuts off the sealed portion 116 of the packaging sheet 110 along a line that crosses the length of the packaging sheet 110 at a right angle.

The packaging unit 94 includes a seal-and-cut part 100, opening means 102, and a gas feeder 108.

The seal-and-cut part 100 seals the packaging sheet 110 and then cuts off the sealed portion 116 of the packaging sheet 110 along a line that crosses the length of the packaging sheet 110 at a right angle. The seal-and-cut part 100 comprises a heat sealer (not shown) and a cutter (also not shown); the heat sealer has a pair of heaters 100a and 100b that can be moved toward or away from each other in a direction perpendicular to the surface 110a of the packaging sheet 110.

The opening means 102 widens the slits 112 in the packaging sheet 110 to form an opening 112a. The opening means 102 may comprise a sucker and means of moving the sucker (not shown). The sucker is attached to the surface 110a of the packaging sheet 110 at a position below the slit 112 and is moved by the moving means so as to form the opening 112a in the packaging sheet 110.

The gas feeder 108 also serves to form the opening 112a in the packaging sheet 110 and may comprise a gas cylinder or a compressor. The gas feeder 108 is fitted with a nozzle 108a the tip of which is located near the slit 112 in the packaging sheet 110 that has been transported by the transport roller 92b. When the slit 112 is widened by the opening means 102 to form the opening 112a, a gas such as air is blown into the opening 112a as it is ejected through the nozzle 108a from the gas feeder 108, whereby the packaging sheet 110 is expanded.

It should be noted here that if a gas such as air that is ejected through the nozzle 108a can widen the slit 112 in the packaging sheet 110 to form the opening 112a, thereby expanding the packaging sheet 110, the opening means 102 may be omitted.

The transport roller pairs 96a and 96b are provided below the packaging unit 94 to transport the packaging sheet 110 such that the photographic pack 114 is discharged into the photographic pack recovery unit 98. The rollers in each of the transport roller pairs 96a and 96b can move toward or depart away from each other in a direction perpendicular to the surface 110a of the packaging sheet 110 but they are preferably urged in a direction that brings them into mutual contact so as to produce a specified pinching force.

The photographic pack recovery unit 98 is a site where the photographic pack formed in the one-side image forming apparatus 16 is recovered by means of an inclined board 98a provided below the transport roller pair 96b.

The stock unit 104 is a site where the stack S which is made by superposing the order information print 120 and the photographic prints P in one order (see FIG. 5A) is retained. This stock unit 104 is provided in an inclined state with respect to the packaging unit 94. The stock unit 104 is equipped with a stopper 106 that keeps the stack S in position so that it will not slide down toward the packaging unit 94.

In the one-side image forming apparatus 16 according to the embodiment, the image recording side faces up, so the order information print 120 and the photographic prints P in one order are transported in this order into the stock unit 104, where they are stacked with both the index image recording side 120a of the order information print 120 and the image recording side of each photographic print P facing up. In order to ensure that among the photographic prints P in one order, the last obtained photographic print 150 (which is hereinafter referred to as the last print 150) is so oriented as to get its image recording side 150a to face inward whereas its back printed side (non-image recording side) 150b faces outward, the last photographic print 150 is inverted in the switchback unit 80 before it is transported to the stock unit 104. As a result, the stock unit 104 accommodates the order information print 120 and the photographic prints P in one order as they are stacked in this order, the order information print 120 being the bottommost. In this case, the index image recording side 120a of the order information print 120 is directed inward whereas the fee recording side 120b is directed outward. The image recording side 150a of the last photographic print 150 is directed inward. In other words, the photographic prints P in one order and the order information print 120 are stacked in such a way that both the image recording side 150a of the last photographic print 150 and the fee recording side 120b of the order information print 120 face the same direction.

In the embodiment, the stopper 106 is released as the stock unit 104 contains the stack S of the photographic prints P in one order that are superposed on the order information print 120, whereupon the stack S comes out of the stock unit 104 to slide down through the opening 112a to be accommodated within the packaging sheet 110.

When the prints made by the one-side printer 30 in the embodiment are being transported to the packer 32, the image recording sides of the photographic prints P face up and so does the index image recording side 120a of the order information print 120.

Hence, in the embodiment, the photographic print 150 which has been obtained the last of all the prints in one order is inverted by the switch-back unit 80. As a result, the prints can be accumulated in the stock unit 104 in such a state that both the fee recording side 120b of the order information print 120 and the back printed side (non-image recording side) 150b of the last photographic print 150 face outward, with the rest of the photographic prints P in one order being sandwiched in superposition (to form the stack S).

Described below is the action of the packer 32 in the embodiment.

Note that the stack S is already deposited in the stock unit 104 and prevented from sliding down by means of the stopper 106.

In the packer 32, the packaging sheet 110 is first fed into the packaging unit 94, where the seal-and-cut part 100 forms the sealed portion 116 in the area which corresponds to the bottom of the photographic pack 114.

The transport roller pairs 96a and 96b then rotate to transport the packaging sheet 110 to the position where the slit 112 can be widened by the opening means 102.

The opening means 102 then widens the slit 112 in the packaging sheet 110 to form the opening 112a. On this occasion, the two rollers of the transport roller pair 96a are spaced apart by a specified distance that allows subsequent expansion of the packaging sheet 110.

A gas, say, air is then ejected from the gas feeder 108 through the nozzle 108a and blown into the opening 112a to expand the packaging sheet 110.

The stopper 106 at the bottom of the stock unit 104 containing the stack S is then released so that the stack S slides down through the opening 112a to get into the packaging sheet 110.

Then, the transport roller pairs 96a and 96b are so adjusted that the gap between the two rollers of each pair is sufficiently wide that the packaging sheet 110 of a specified thickness can be transported as it is held between those rollers; the packaging sheet 110 is then transported until the opening 112a reaches the active position of the seal-and-cut part 100.

The seal-and-cut part 100 then seals the opening 112a to form the sealed portion 116, which is subsequently cut off. This completes the process of producing the photographic pack 114.

Thereafter, the transport roller pairs 96a and 96b further rotate to transport the photographic pack 114 into the photographic pack recovery unit 98. The photographic pack 114 can then be recovered from the photographic pack recovery unit 98.

Figure 5A:
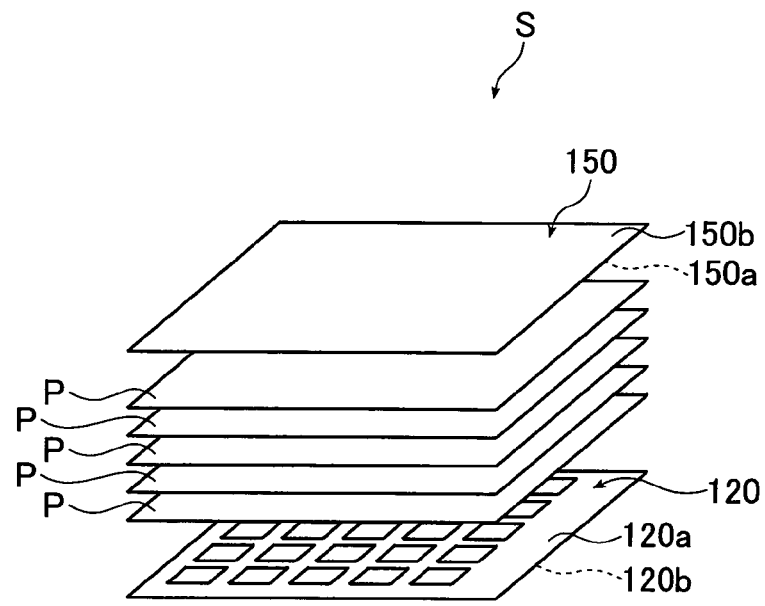
FIG. 5A is a schematic perspective view showing an exemplary stack composed of photographic prints and an order information print.
Figure 5B:
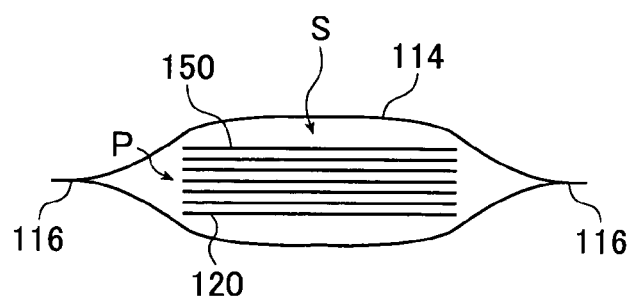
FIG. 5B is a schematic sectional side view of an exemplary photographic pack according to the embodiment shown in FIG. 5A.

As shown in FIG. 5B, the photographic pack 114 in the embodiment is formed by accommodating the stack S within the bag that is formed of the transparent packaging sheet 110. The stack S is such that both the fee recording side 120b of the order information print 120 and the back printed side (non-image recording side) 150b of the photographic print 150 which is the last of the photographic prints P in one order face outward, with the rest of the photographic prints P being sandwiched in superposition.

Hence, one can confirm the number of the photographic prints P in one order but neither the index image recording side 120a of the order information print 120 nor the image recording side 150a of the last photographic print 150 can be recognized from the outside. This means both the index images and the images on the photographic prints P are invisible from the outside of the photographic pack 114, whereby the privacy of the customer is effectively protected. By looking at the fee recording side 120b of the order information print 120, the customer can check the fee for the photographic prints in one order and, if necessary, his or her self and the contents of the order placed can also be confirmed.

As is clear from FIG. 6A, the index image recording side 120a of the order information print 120 serves as a reference for the contents (images) of the photographic prints P in one order that are accommodated in the photographic pack 114. On the index image recording side 120a, all images of the photographic prints P in one order within the photographic pack 114 are shown as index images 122 in a smaller size and recorded according to a certain criterion, for example, in the order in which they were taken.

The method of arranging the index images 122 on the index image recording side 120a is not limited in any particular way. In one example, they may be grouped by scene depending on the object that was shot, whether it is a human or a landscape.

The fee recording side 120b of the order information print 120 records at least the fee for the photographic prints P in one order that have been produced according to the customer's order. As shown in FIG. 6B, the fee recording side 120b in the embodiment may also record a title 132, an order information data 134, and a bar code 136, all of which are recorded in accordance with a specified format.

In addition to the fee for the photographic prints P in one order, the fee recording side 120b in the embodiment may record the order information data 134 such as the information about the customer, as exemplified by a customer's telephone number 134d, a customer's name 134e, and a customer's address 134f; these pieces of the information about the customer are recorded on the left side of the fee recording side 120b. Other pieces of the order information data that can be recorded on the left side of the fee recording side 120b are the order reception number 134a, an order reception data and time 134b, and a customer ID 134c, all of which were acquired at the time the order was placed. Also recorded is the bar code 136 correlated with the fee for the photographic prints P in one order. In other words, the fee for the photographic prints P is recorded in bar code.

The particulars of the print job (the contents of the order) are recorded in the form of a table 138 on the right side of the fee recording side 120b. The table 138 has four sections, i.e. image file's name (138a), subtotal (138b, 140b), number of prints (140a), and print fee (140c). In the respective sections, the image file's name, the number of prints and the print fee are filled in according to the order information data and the fee data.

In the embodiment, the fee recording side 120b may contain other pieces of information, such as the film ID number, frame number, print size, lab shop ID number, and the date and time of printing. As for the contents to be recorded on the fee recording side 120b, more than one format may be preliminarily provided for the fee recording side 120b and modified as appropriate for the specific order information data that is entered from the order receiver 12a or 12b; the formats to be prepared are not limited in any particular way.

In the embodiment, the order information data may be recorded in a variety of ways on the fee recording side 120b, including letters, numerals and symbols; alternatively, the order information data may be recorded in one- or two-dimensional bar codes. The order information data to be recorded on the fee recording side 120b is not limited to that acquired when the order was placed, as exemplified by the order reception number, the date and time of order reception, and the customer ID print; information that has been generated in the course of print processing may also be recorded, as exemplified by the processing machine ID number and the treatments that have been applied.

The one-side image forming apparatus 16 in the embodiment employs either the packer 32 having the inverting mechanism (switch-back unit 80) or the processor 60 having the inverting mechanism and the packer 32 that does not have the switch-back unit 80 and, hence, despite its forming images only on one side of the recording medium, the apparatus can make a package of the stack S in which both the fee recording side 120b of the order information print 120 and the back printed side (non-image recording side) 150b of the photographic print 150 which is the last of the photographic prints P in one order face outward, with the rest of the photographic prints P being sandwiched in superposition. Hence, neither the index image recording side 120a nor the contents of the records on the photographic prints P can be seen from the outside of the photographic pack 114, but only the number of the photographic prints P and the contents of the fee recording side 120b can be confirmed. Thus, by hiding the index image recording side 120a and the image recording sides of the photographic prints P, the privacy of the customer is effectively protected. As a further advantage, in order to check the fee and the contents of the order placed such as the number of prints, the customer only needs to look at the fee recording side 120b and does not have to open the photographic pack 114.

All that is necessary for the packaging sheet 110 is that the fee recording side 120b should be recognizable from the outside and it does not have to be transparent in every part of it. In order to ensure that the fee recording side 120b can be recognized from the outside, the packaging sheet 110 is preferably clear in that part which corresponds to the fee recording side 120b but not clear in the other parts. Therefore, the packaging sheet 110 only needs to be at least partially transparent.

Figure 7A:
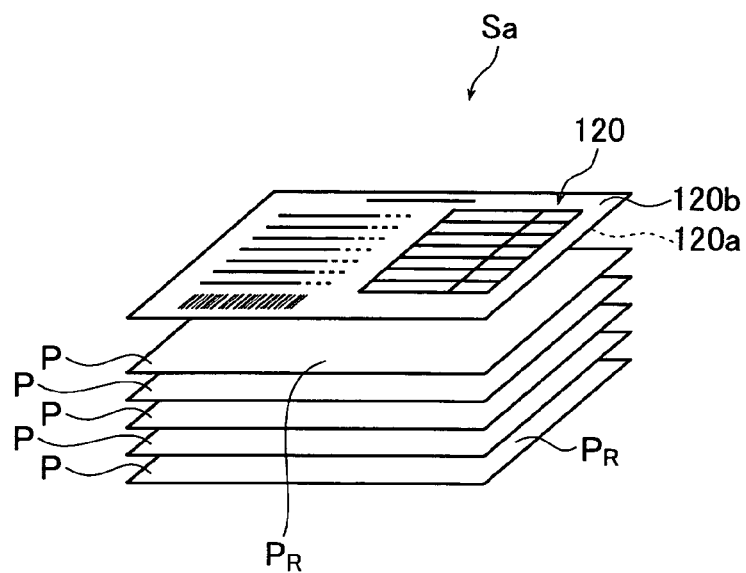
FIG. 7A is a schematic perspective view showing another exemplary stack composed of photographic prints and an order information print.

In the embodiment, the form of the stack S is not limited to what is shown in FIG. 5A but it may adopt the orientation shown in FIG. 7A.

Figure 7B:
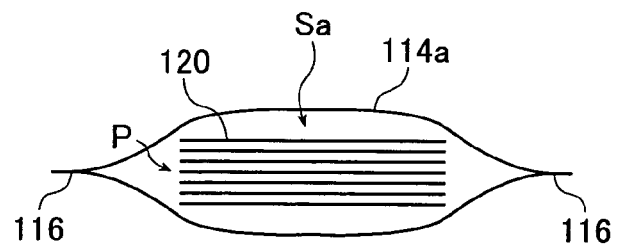
FIG. 7B is a schematic sectional side view of another exemplary photographic pack according to the embodiment shown in FIG. 7A.

FIG. 7A is a schematic cross-sectional view showing another example of the stack, and FIG. 7B is a schematic cross-sectional view showing another example of the photographic pack. The stack is generally indicated by Sa in FIG. 7A and the constituents that are the same as those of the stack S shown in FIG. 5A are identified by like numerals and will not be described in detail.

As shown in FIG. 7A, the stack Sa is formed by superposing the order information print 120 on the photographic prints P in one order in such a way that the index image recording side 120a of the order information print 120 and all image recording sides $P_R$ of the photographic prints P face inward. The resulting stack Sa is then put into a bag formed of the transparent packaging sheet 110, whereupon a photographic pack 114a is completed. Again, the image recording sides $P_R$ of the photographic prints P in the photographic pack 114a are oriented to face the inside of the stack Sa. The index image recording side 120a of the order information print 120 faces the inside of the stack Sa whereas the fee recording side 120b faces its outside. Thus, in the stack Sa, the image recording sides $P_R$ of the photographic prints P and the fee recording side 120b of the order information print 120 face the same direction. As a result, neither the index images on the order information print 120 nor the contents of the photographic prints P can be recognized from the outside. The photographic pack 114a in which such the stack Sa is packed (see FIG. 7B) can achieve the same effect as is obtained by the photographic pack 114 shown in FIG. 5B.

In order to prepare the stack Sa shown in FIG. 7A using the one-side image forming apparatus 16 according to the embodiment, the photographic prints P in one order and the order information print 120 may be outputted and transported in this order into the stock unit 104, where they are stacked with the image recording side $P_R$ of each photographic print P facing up. In order to ensure that the index image recording side 120a of the order information print 120 faces inward whereas its fee printing side 120b faces outward, the order information print 120 is inverted in the switch-back unit 80 before it is transported to the stock unit 104. As a result, the stock unit 104 accommodates the photographic prints P in one order and the order information print 120 as they are stacked in this order, whereupon the above-described stack Sa is produced. The non-image recording side of the outermost print P faces the outside of the stack Sa and so does the fee recording side 120b of the order information print 120.

We then describe the two-side image forming apparatus 18.

As shown in FIG. 1, the two-side image forming apparatus 18 includes the two-side printer 34 and the packer 36.

Figure 8:
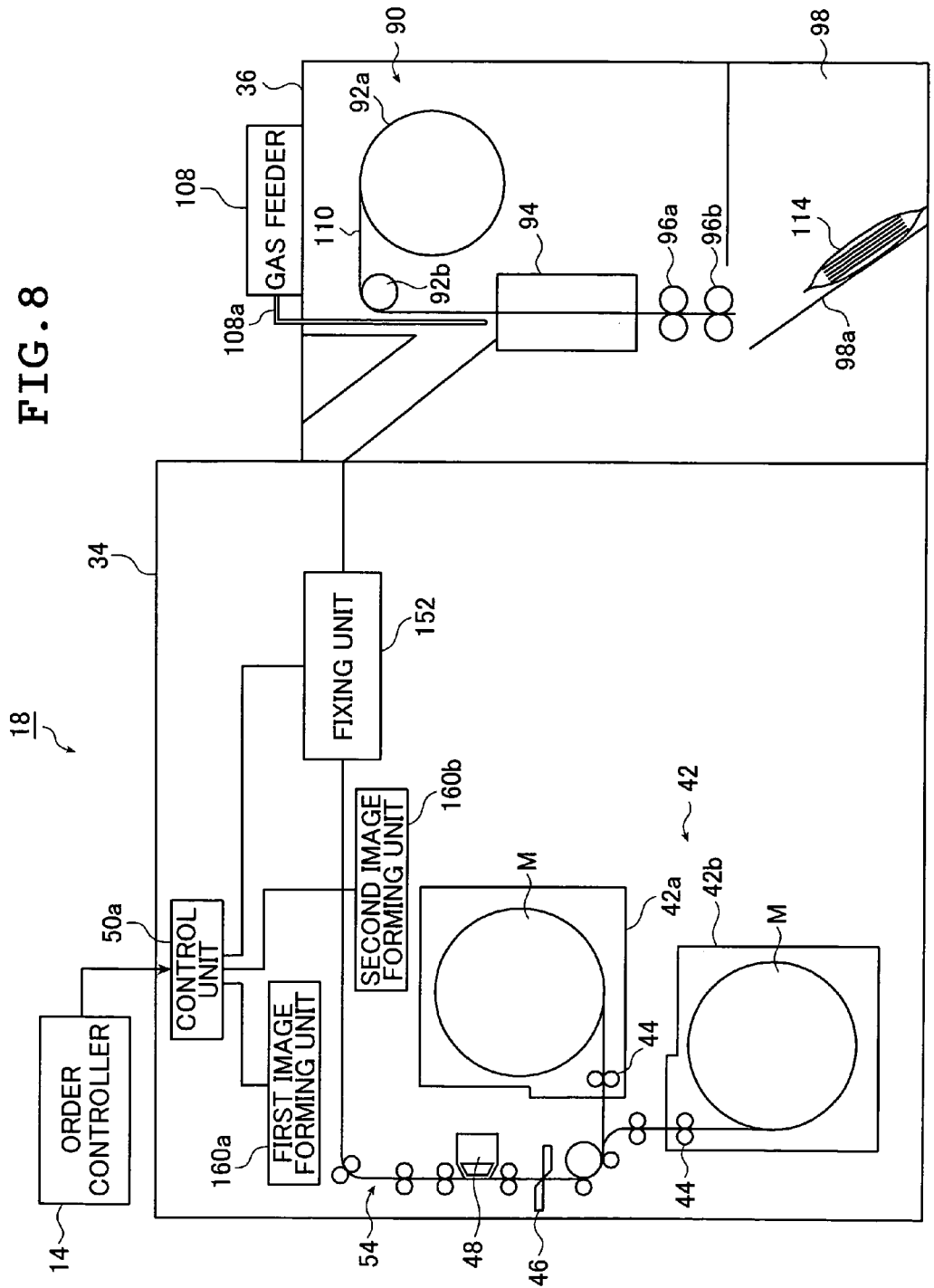
FIG. 8 is a schematic cross-sectional view showing an exemplary two-side image forming apparatus for producing a photographic pack according to the embodiment of the present invention.

FIG. 8 is a schematic cross-sectional view showing the two-side image forming apparatus that produces photographic packs according to the embodiment of the present invention. The two-side image forming apparatus 18 in FIG. 8 and the constituents that are the same as those of the one-side image forming apparatus 16 shown in FIG. 2 are identified by like numerals and will not be described in detail.

As is clear from FIG. 8, the two-side printer 34 in the embodiment is an electrophotographic printer and can record an image on both sides of a recording medium M. The two-side printer 34 comprises the feeder 42, a first image forming unit (image recording unit) 160a, a second image forming unit (image recording unit) 160b, a fixing unit 152, and a control unit 50a. The feeder 42 is of the same design as that in the one-side printer 30, except that the recording medium M to be supplied is not the light-sensitive material A.

The only difference between the packer 36 in the two-side image forming apparatus 18 and the packer 32 in the one-side image forming apparatus 16 is that the former does not have the switch-back unit 80 and the other features are the same in the two packers; therefore, the packer 36 will not be described in detail.

The two image forming units 160a and 160b are positioned on opposite sides of the transport path of the recording medium M. The first image forming unit 160a and the second image forming unit 160b are both adapted to form monochromatic or color toner images on the recording medium M and they are not limited to any particular types.

The fixing unit 152 is a unit with which the toner images formed by the first image forming unit 160a and the second image forming unit 160b are fixed to the recording medium M.

The two-side printer 34 in the embodiment can form an image on both sides or on either side of the recording medium M. Hence, there is no need to invert the photographic prints for producing the photographic pack 114 and the inverting mechanism can be eliminated to simplify the overall structure of the packer 36.

In the two-side printer 34 according to the embodiment, the two different image forming units, i.e., the first image forming unit 160a and the second image forming unit 160b, are selectively operated to form the index image recording side 120a and the fee recording side 120b of the order information print 120.

Referring further to the two-side image forming apparatus 18 in the embodiment, the stock unit in the packer 36 is of the same design as with that in the packer 32 in the one-side image forming apparatus 16. Hence, in order to form the stack S shown in FIG. 5A, the first image forming unit 160a may be so operated that the index image recording side 120a of the order information print 120 is oriented to face the same direction as the image recording side of each photographic print P from the recording medium M whereas the second image forming unit 160b is so operated that the fee recording side 120b of the order information print 120 is oriented to face the opposite direction. The image recording side 150a of the photographic print 150 which is the last of the photographic prints P in one order is oriented to the opposite side of the image recording sides of the rest of the photographic prints P by means of the second image forming unit 160b. As a result, when the prints are accumulated in the stock unit (not shown) as the stack S, both the fee recording side 120b of the order information print 120 and the back printed side (non-image recording side) 150b of the last photographic print 150 face outward, with the rest of the photographic prints P in one order being sandwiched in superposition.

In order to form the stack Sa shown in FIG. 7A, the first image forming unit 160a may be operated to produce photographic prints P; then, the second image forming unit 160b is so operated that the index image recording side 120a of the order information print 120 is oriented to the opposite side of the image recording side of each photographic print P from the recording medium M whereas the first image forming unit 160a is so operated that the fee recording side 120b of the order information print 120 is oriented to face the same direction as the image recording side $P_R$ of each photographic print P. As a result, when the prints are accumulated in the stock unit (not shown) as the stack Sa, they are superposed in such a state that both the index image recording side 120a of the order information print 120 and the image recording sides $P_R$ of the photographic prints P in one order face inward.

Note that whether the stack S or Sa is to be formed, it is the first image forming unit 160a that forms the image forming sides of photographic prints P.

In the next step, the photographic pack 114 is produced by the packer 36 but since the process is essentially the same as with the packer 32 in the one-side image forming apparatus 16, it will not be described in detail.

As a result, one can produce the same product as the photographic pack 114 which is produced by the one-side image forming apparatus 16.

We now describe the method of forming the photographic pack 114 by the print system 10 according to the embodiment.

In the first step, the customer enters order information data into the order receiver 12a. On this occasion, the image data for the images to be printed may be entered simultaneously with the order information data.

When the order is fixed, the order receiver 12a tags the order reception number, the date and time of order reception, and the customer ID to the order information data, which is then outputted to the order controller 14 together with the image data from which the customer has ordered to make prints. In addition, the order receiver 12a issues a claim receipt when the order has been fixed.

In the next step, the order controller 14 examines the entered order information data and the order table which describes the order in which the other order information data that have already been entered should be processed and considering either the due date or productivity or both, the order controller 14 determines when the newly entered order information data should be processed and updates the order table.

The order controller 14 also calculates the fee for the photographic prints in one order on the basis of the entered order information data. The fee data comprising the calculated fee for the photographic prints in one order is controlled as part of the order information data and, at the same time, it is outputted to the clearing machine 20.

In the next step, the order controller 14 prepares printing image data from the image data for the images to be printed in accordance with the customer's order. From the printing image data, the order controller 14 prepares indexing image data which allows the individual images in one order to be recorded collectively in a smaller size. In addition, on the basis of the order information data including the fee data, the order controller 14 prepares data for the fee recording side which complies with the format of the fee recording side 120b. The thus prepared printing image data, indexing image data and data for the fee recording side are put together to create print order information for one order.

In the next step, the order controller 14 outputs the print order information to either the one-side image forming apparatus 16 or the two-side image forming apparatus 18.

The one-side image forming apparatus 16 or the two-side image forming apparatus 18 then produces prints on the basis of the print order information as supplied from the order controller 14; the prints are then fed into the packer 32 or 36, where the photographic prints P and the order information print 120 are superposed in such a way that the non-image recording side 150b of the last photographic print 150 and the fee recording side 120b of the order information print 120 face outward and the resulting stack S is packaged in a bag that is at least partially transparent. This completes the process of producing the photographic pack 114.

The photographic pack 114a shown in FIG. 7B can be produced in a similar way to the photographic pack 114 by packaging the stack Sa in which the photographic prints P and the order information print 120 are superposed, with the image recording side $P_R$ of each photographic print P and the index image recording side 120a of the order information print 120 being oriented to face inward.

In the embodiment, the photographic pack 114 is handed to the customer in exchange for the claim receipt at a suitable place, say, where the clearing machine 20 is set up. The customer pays the fee after checking the fee recording side 120*b* of the order information print 120. Since the bar code 136 correlated with the fee for the photographic prints in one order is recorded on the fee recording side 120*b* of the order information print 120, this bar code may be read to perform settlement of the fee for the photographic prints in one order.

In the embodiment, the image data to be received at the time the customer places a print order may be an exposed film. The exposed film is developed and the developed film is read with a scanner to prepare image data. The result that can be obtained in this case is the same as what is achieved in the embodiment, except that the film must be returned to the customer or a prior agreement to non-return is obtained from the customer.

In the embodiment, the one-side image recording apparatus 16 has the inverting mechanism (switch-back unit 80) but this is not the sole case of the present invention and an ink-jet head 200 may be provided for recording an image on the side of the recording medium which is opposite the side where an image is recorded by the exposure unit 52. The use of such the ink-jet head 200 obviates the switch-back unit 80. However, considering the image quality that can be attained with the one-side image recording apparatus 16, the ink-jet head preferably records an image on the same side of the recording medium as where the exposure unit 52 records an image.

In the embodiment, the method by which the one-side image recording apparatus 16 and the two-side image recording apparatus 18 record images is not limited in any particular way and the applicable methods include not only silver halide photography, electrophotography and the ink-jet process but also thermfusion and various other methods, from which a suitable method can be selected depending on the required image quality or print format.

While the photographic pack and print system of the present invention have been described in detail on the foregoing pages with reference to the preferred embodiments, the present invention is in no way limited to those embodiments and it should be understood that various improvements and modifications are possible without departing from the scope and spirit of the present invention.

What is claimed is:

1. A photographic pack comprising:
   photographic prints in one order, each having an image recorded on one side;
   an order information print that has index images in said one order recorded on a first side, each corresponding to said image and at least a fee for said photographic prints in said one order recorded on a second side; and
   an at-least-partially-transparent bag having at least a transparent area, and for accommodating a stack formed by superposing said order information print and said photographic prints in said one order,
   wherein a non-image recording side of a first photographic print of said photographic prints in said stack faces outward, said second side of said order information print faces outward and is positioned at said transparent area of said bag, and the rest of said photographic prints in said one order are sandwiched between said first photographic print and said order information print.

2. The photographic pack according to claim 1, wherein said rest of said photographic prints in said one order have their non-image recording sides face the same direction as said non-image recording side of said first photographic print.

3. The photographic pack according to claim 1, wherein at least information about a customer and contents of said one order of said customer are further recorded on said second side of said order information print.

4. The photographic pack according to claim 1, wherein said fee for said photographic prints in said one order is recorded in bar code.

5. A print system comprising:
   an order reception means for receiving one order of a customer including order information data about contents of a printing order, and image data;
   a fee calculating means for calculating a fee for photographic prints in said one order, each having an image recorded on one side, based on said one order of said customer;
   a printer which, based on said order information data and said image data that have been received by said order reception means for said one order, prepares said photographic prints in said one order and an order information print that has index images in said one order recorded on a first side, each corresponding to said image and at least a fee for said photographic prints in said one order recorded on a second side; and
   a packaging means by which a stack formed by superposing said order information print and said photographic prints in said one order is accommodated and packaged in an at-least-partially-transparent bag having at least a transparent area,
   wherein a non-image recording side of a first photographic print of said photographic prints in said stack faces outward, said second side of said order information print faces outward and is positioned at said transparent area of said bag, and the rest of said photographic prints in said one order are sandwiched between said first photographic print and said order information print.

6. The print system according to claim 5, wherein
   said printer comprises an image recording unit for recording said image on one side of a recording medium and an information recording unit for recording information on the other side of said recording medium;
   each of said photographic prints is such that said image reproducing said image data for a single print is recorded on a image recording side being said one side of said recording medium by means of said image recording unit and that back print information is recorded on said non-image recording side being the other side of said recording medium by means of said information recording unit; and
   said order information print is such that said index images for said one order are recorded on said first side being said one side of said recording medium by means of said image recording unit and that at least said fee for said photographic prints in said one order is recorded on said second side being the other side of said recording medium by means of said information recording unit.

7. The print system according to claim 5, wherein said packaging means comprises a reversing means for reversing at least one of said photographic prints or said order information print outputted from said printer.

8. The print system according to claim 7, wherein the reversing means reverses one photographic print or said order information print that has been prepared in said printer as last one of said photographic prints in said one order and said order information print.

9. The print system according to claim 5, wherein said printer further comprises a reversing means for reversing at least one of said photographic prints or said order information print.

10. The print system according to claim 5, wherein said printer comprises a first image recording unit for recording an image on one side of a recording medium and a second image recording unit for recording an image on the other side of said recording medium, at least one of said first and second image recording units records, in addition to said image, at least said fee for said photographic prints in one order; and said index images for said one order have been recorded on said first side of said order information print by one of said first and second image recording units and said fee for said photographic prints in said one order have been recorded on said second side by the other of said first and second image recording units.

11. A print system comprising:

an order receiver for receiving one order of a customer including order information data about contents of a printing order, and image data;

a fee calculator for calculating a fee for photographic prints in said one order, each having an image recorded on one side, based on said one order of said customer;

a printer which, based on said order information data and said image data that have been received by said order receiver for said one order, prepares said photographic prints in said one order and an order information print that has index images in said one order recorded on a first side, each corresponding to said image and at least a fee for said photographic prints in said one order recorded on a second side; and a packer by which a stack formed by superposing said order information print and said photographic prints in said one order is accommodated and packaged in an at-least-partially-transparent bag having at least a transparent area, wherein a non-image recording side of a first photographic print of said photographic prints in said stack faces outward, said second side of said order information print faces outward and is positioned at said transparent area of said bag, and the rest of said photographic prints in said one order are sandwiched between said first photographic print and said order information print.

12. The print system according to claim 11, wherein said printer comprises an image recording unit for recording said image on one side of a recording medium and an information recording unit for recording information on the other side of said recording medium;

each of said photographic prints is such that said image reproducing said image data for a single print is recorded on a image recording side being said one side of said recording medium by means of said image recording unit and that back print information is recorded on said non-image recording side being the other side of said recording medium by means of said information recording unit; and said order information print is such that said index images for said one order are recorded on said first side being said one side of said recording medium by means of said image recording unit and that at least said fee for said photographic prints in said one order is recorded on said second side being the other side of said recording medium by means of said information recording unit.

13. The print system according to claim 11, wherein said packer comprises a reversing unit for reversing at least one of said photographic prints or said order information print outputted from said printer.

14. The print system according to claim 13, wherein said reversing unit reverses one photographic print or said order information print that has been prepared in said printer as last one of said photographic prints in said one order and said order information print.

15. The print system according to claim 11, wherein said printer further comprises a reversing unit for reversing at least one of said photographic prints or said order information print.

16. The print system according to claim 11, wherein said printer comprises a first image recording unit for recording an image on one side of a recording medium and a second image recording unit for recording an image on the other side of said recording medium, at least one of said first and second image recording units records, in addition to said image, at least said fee for said photographic prints in one order; and said index images for said one order have been recorded on said first side of said order information print by one of said first and second image recording units and said fee for said photographic prints in said one order have been recorded on said second side by the other of said first and second image recording units.

* * * * *